April 22, 1969     P. G. KIMBALL     3,440,650
DOPPLER SYSTEM OSCILLATOR CIRCUIT
Filed Dec. 29, 1967
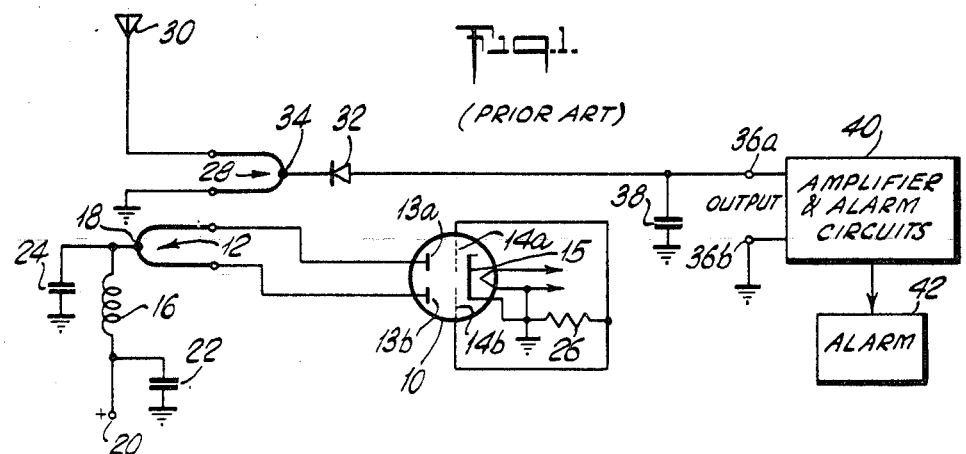
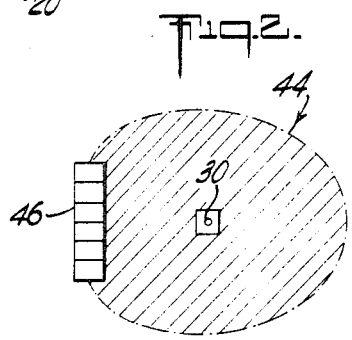
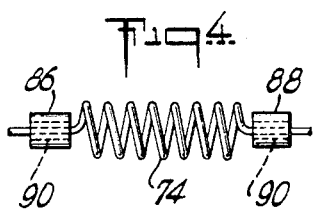
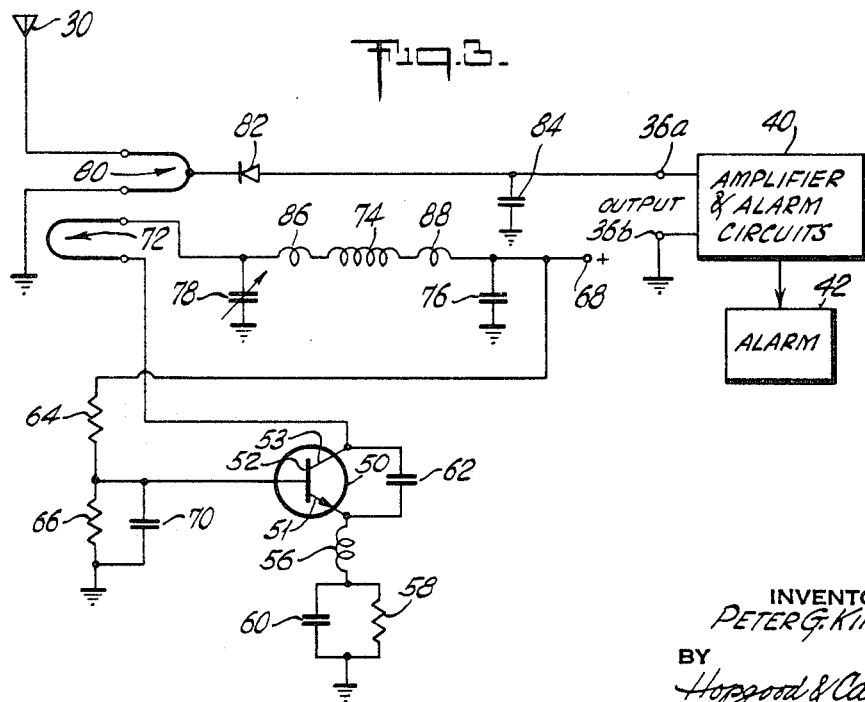
INVENTOR
PETER G. KIMBALL
BY
Hopgood & Calimafde
ATTORNEYS United States Patent Office 3,440,650
Patented Apr. 22, 1969

3,440,650
DOPPLER SYSTEM OSCILLATOR CIRCUIT
Peter G. Kimball, Southington, Conn., assignor to Metalite, Inc., Meriden, Conn., a corporation of Connecticut
Filed Dec. 29, 1967, Ser. No. 694,605
Int. Cl. G01s 9/42
U.S. Cl. 343—5       4 Claims

ABSTRACT OF THE DISCLOSURE

An ultrastable oscillator circuit for a Doppler system having filter means for removing unwanted signal components so that the output at the detector stage of the system is representative only of a moving object in the field of radiation and substantially insensitive to the presence of such signal components.

*Background of the invention*

In Doppler-type radar systems, it is important that the transmitter oscillator be as stable as possible and free from the influence of sporadic or transient unwanted signals such as spike potentials and the like. This is especially true when the system is employed in burglar alarm and similar type applications where such unwanted signals produce a false signal indication or false alarm. Such unreliable operation is extremely disruptive to the owner of the premises and results in unnecessary police calls, service calls to the manufacturer of the system and is generally inconvenient and annoying to the various people concerned. As far as I am aware, up to the present time, no satisfactory solution to this problem has yet been provided.

*Objects of the invention*

It is one of the principal objects of this invention to provide an ultrastable Doppler system having more stable operating characteristics than like prior art systems.

Another object of the invention is to provide a more stable transmitter oscillator for Doppler radar systems.

A still further object is to provide an improved Doppler system which is insensitive to unwanted sporadic, transient and other unwanted signals than prior art systems.

A still further object is to provide an improved and ultrastable system for sensing the presence of a moving object.

Yet another object is to provide a system for sensing the presence of a moving object which has more reliable operating characteristics than similar systems heretofore known.

A further object is to provide a more reliable system for detecting the presence of a moving object in that the system produces an alarm signal only in response to a moving object and in that it is substantially insensitive to the presence of sporadic, transient and other unwanted signal components.

*Brief description of drawing*

FIG. 1 is a schematic wiring diagram of a conventional circuit employed as part of a Doppler type moving object detection and alarm system.

FIG. 2 illustrates one field pattern configuration of the radiated field emitted by the Doppler transmitter antenna.

FIG. 3 is a schematic wiring diagram of a circuit employing the principles of this invention and which can be employed in lieu of the circuit of FIG. 1, and FIG. 4 shows a view of one embodiment of a novel structure employed in FIG. 3 in accordance with the invention.

*Summary of the invention*

Briefly, the invention concerns a Doppler radar type system which employs an oscillator circuit for transmitting electromagnetic wave energy to an antenna for radiating a field pattern of suitable configuration. The circuit further includes means for receiving waves reflected back from the field and detector means for detecting the presence of a moving object in the pattern. In accordance with the invention, means are also provided in the circuit for filtering out any sporadic, transient or other unwanted signals which ordinarily exist from time to time in the oscillator circuit. By filtering out or suppressing these signals, the oscillator circuit is made more reliable in that the detector connected thereto will not produce a false alarm signal when there is no moving object in the field pattern.

*Detailed description of preferred embodiment*

Referring now to FIG. 1, there is shown a prior art oscillator-type circuit which employs a dual triode tube 10. A first high frequency loop 12 is connected between the plate elements 13a and 13b of the triode 10. A radio frequency choke coil 16 is connected between a center tap connection 18 of the loop 12 and a terminal 20 provided for connection to a source of DC operating potential. Radio frequency by-pass capacitors 22 and 24 are provided between the opposite ends of the coil 16 and chassis ground in well known manner. The grid elements 14a and 14b are connected together with a self biasing resistor 26 between these elements and ground. The cathode element 15 is grounded. The circuit thus far described comprises a high frequency oscillator which operates, for example, in the 400 mc. region.

Signal energy developed in the oscillator is transferred to a second high frequency loop 28 which is placed in electromagnetic coupling relationship with respect to the first loop 12. This second loop 28 is connected at one end to chassis ground; the other end is connected by suitable connecting means to an antenna 30 which operates both as a transmitting antenna and a receiving antenna, as will further appear. A diode detector 32 is connected between a center tap 34 on the second loop 28 and one of a pair of output terminals 36a and 36b across which the signal output from the detector 32 appears. A capacitor 38 is connected between the output terminal 36a and ground. An output signal appearing between the output terminals 36a and 36b is fed in well known manner to a conventional amplifier and alarm circuit unit 40 which utilizes the output at these terminals to actuate a suitable alarm 42 which may be bells, gongs, lights, annunciators, automatic police alerting signal means or other suitable devices for a particular application.

When the circuit of FIG. 1 is energized, the antenna 30 radiates energy which may have a field pattern configuration such as that indicated by the numeral 44 in FIG. 2. This pattern 44 may have different configurations, depending upon the particular application. For the application used as an example herein, the field pattern of FIG. 2 is arranged to guard valuable information in a group of filing cabinets 46 against access by unauthorized personnel. The protective system described herein will ordinarily be turned off during the day so that no field pattern is produced when certain authorized personnel are present. However, during non-working hours when monitoring is required, the area in front of the filing cabinets 46 will be protected by the field pattern 44 when the system is energized.

The circuit of FIG. 1 performs the functions of an oscillator, a transmitter, a receiver and a detector. During normal operation, the energy from the oscillator is transferred from the first loop 12 to the second loop 28 and to the antenna 30, which transmits this energy to produce the field pattern 44. Energy from this radiated field pattern is also received back by the antenna 30 in accordance with well known Doppler radar principles, and produces a signal in the loop 28. This returned signal energy is detected by the diode 32, which functions as a detector-comparator and produces an output signal between the output terminals 36a and 36b. In the absence of a moving object in the field pattern 44, the returned signal has the same frequency as the transmitted signal and as a result an output signal of substantially zero is produced at the output terminals 36a and 36b. Accordingly, under such conditions, the amplifier and alarm circuits 40 and alarm 42 are not actuated.

However, when any moving object such as, for example, a person, enters the field pattern 44 to gain access to the files, the microwave signal energy which bounces back to the antenna 30 has a slightly different frequency than that of the transmitted signal and exists on the second loop 28. In accordance with well known Doppler principles, the diode 32 compares the received signal under this condition with the signal transmitted and detects the difference. This detected difference takes the form of a signal output at the output side of the diode 32 and appears across the output terminals 36a–36b. A person moving in the field pattern 44 might typically cause a frequency difference of, for example, 1–2 cycles between the signal producing the field pattern and that reflected back to the antenna, with ½–5 cycles being the range of frequency difference that could ordinarily be produced by any moving person. For the condition represented by the frequency difference of ½–5 cycles, a DC voltage output between the terminals 36a and 36b would range between 3–6 volts DC, with the value of 3 volts being the threshold potential necessary to cause the amplifier and alarm circuits 40 to actuate the alarm 42. By contrast, if there is no movement of any person or other object within the radiation field pattern 44, a voltage of the order of several microvolts would be produced and this may be considered substantially zero as a practical matter. Thus it will be seen that when a person enters the radiation field pattern 44, a threshold signal is produced which actuates the alarm 42 and that, theoretically, in the absence of such person no alarm is given.

In actual operation, however, this is not the case. This is because during operation, unwanted signals of varying potential levels occur in the circuit of FIG. 1. These signals may take the form of ripple, harmonics, spike potentials, noise, or other signals of a sporadic or transient character. These unwanted signals have a very disadvantageous effect in that they not infrequently result in causing an output potential at the terminals 36a–36b which exceeds the threshold level at which the alarm 42 is actuated by the amplifier and alarm circuits 40. While it might seem that raising the threshold level would solve this problem or that it would be a relatively simple matter to eliminate these unwanted signals, this has not been found to be the case and false tripping of the alarm circuits has remained a very difficult problem in the art.

I have discovered a solution to the immediately foregoing problem, the principles of which are embodied in the circuit of FIG. 3. The circuit of FIG. 3 also performs the functions of oscillation, transmission, reception and detection referred to above and may be substituted for the circuit of FIG. 1.

FIG. 3 employs a transistor 50 having emitter, base and collector electrodes 51, 52 and 53 respectively. The emitter 51 is connected to ground by a choke coil 56 in series with a parallel RC network 58–60. A capacitor 62 is provided between the emitter 51 and the collector 53. The base 52 is suitably biased by means of a voltage divider comprising resistors 64 and 66 connected in series between a positive potential terminal 68 and chassis ground. A capacitor 70 of suitable value is connected across the resistor 66. A first high frequency loop 72, similar to the loop 12 of FIG. 1 is connected at one end to the collector 53. The other end of this loop 72 is connected to the positive potential terminal 68 through a choke coil 74. A suitable by-pass capacitor 76 is connected between the terminal 68 and ground on one side of the coil 74 and on the other side of this coil a tuning capacitor 78 is provided for adjusting the frequency of oscillation of the circuit. A second high frequency loop 80 similar to the loop 28 of FIG. 1 is also provided with a detector diode 82 connected between the loop 80 and the output terminals 36a and a bypass capacitor 84 is provided between terminals 36a and 36b.

In accordance with the principles of this invention, the collector circuit coil 74 is provided with novel means for filtering out or suppressing the unwanted signals referred to above. Referring now to FIG. 4, there is shown a physical representation of the coil 74, with means for filtering out the unwanted signals which take the form of ferrite members 86 and 88, see also FIG. 3. These members 86 and 88 are provided at the opposite ends of the coil 74. These members are preferably of ferrite material and of cylindrical shape with central apertures 90 therein generally along the axes of the cylinders, with the wire of the coil 74 passing through these apertures. The members may, of course, be many other shapes such as rectangular, disc shaped and elliptical to name only several, and may be molded with a printed circuit coil as an integral unit, if desired. These members 86 and 88 function similar to isolation transformers to filter out or suppress the unwanted signals which from time to time exist in the oscillator circuit. By employing these members 86 and 88, I have found that the ripple, harmonics, spike potentials, noise and other sporadic and transient signals encountered are rendered ineffective so that no output signal of any significant level is developed at the terminals 36a–36b by the diode 82 under these conditions. As a consequence, the oscillator circuit is now ultra-stable, so that the very difficult problem of false alarms which was a frequent occurrence with prior art systems is no longer a problem.

This invention also provides a number of other advantages over the prior art. In the prior circuits, such as FIG. 1 for example, the original factory adjustment of the loops 12 and 28 to obtain the proper frequency and current was a very tedious and time consuming operation. This disadvantage is entirely eliminated by the superior transistorized circuit of this invention. With this circuit, the proper frequency is easily and quickly set by a simple screwdriver adjustment of the capacitor 78.

Additionally, the tube circuits which were employed heretofore were subject to frequency instability. This was caused by "aging" of the tube, during which cathode material would become deposited on the internal tube parts, thus changing the inductance of the first loop circuit of FIG. 1. This resulted in frequency drift and plate current changes, for which difficult and time consuming readjustment of the loops would have to be made in order to restore proper operation. Furthermore, readjustment to the proper frequency generally resulted in increased plate current. This increased current would accelerate the aging process, so that the readjustment would again become necessary, resulting in still further accelerated aging. The use of a transistor in accordance with this invention eliminates the above undesirable condition, since there is no cathode material to be evaporated.

In summary, the circuit of this invention improves the reliability of operation due to elimination of unwanted signals so that false alarms resulting from such signals do not occur. Additional reliability results from the elimination of tube aging and frequency drift.

Still further, substantial manufacturing economies are realized since the circuit of the invention is much more quickly and easily adjusted. Finally, service calls are greatly reduced since there is no againg to cause frequency drift.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. A DC potential driven device for sensing the presence of a moving object in a radio frequency field pattern, the improvement comprising in combination an antenna, an oscillator circuit supplying a radio frequency signal to the antenna and including a transistor amplifier and a resonator circuit coupled thereto, said resonator circuit having first and second inductively coupled DC isolated loops with the first loop coupled to the antenna for transmission therefrom, a choke coil interconnecting one end of the second loop to the DC potential, and a ferrite transient signal suppressing core placed in series with the second loop and adjacent the coil to suppress spurious signals produced by the oscillator circuit, said second loop being coupled to the amplifier for DC supply and radio frequency coupling thereto, said oscillator producing a radio frequency signal to the antenna to establish a radiation pattern therefrom for the detection of the motion of an object within said radiation pattern, and a diode detector coupled to the first loop to detect object-induced signals thereon to develop an output signal representative of the movement of said object.

2. The invention described in claim 1 wherein a ferrite core is placed on each end of the choke coil with the cores of cylindrical apertured configuration with said apertures being generally along the longitudinal axes thereof and with the coil wires being passed through said apertures.

3. A DC potential driven device for sensing the presence of a moving object, the improvement comprising in combination an antenna, an oscillator circuit including a transistor having a collector and a resonating circuit coupled thereto, said resonating circuit having first and second inductively coupled DC isolated loops with the first loop coupled to the antenna and with the second loop having one end coupled to the collector, a coil interconnecting the other end of the second loop to a terminal of the DC potential and a ferrite member arranged at each end of the coil to suppress sporadic transient signals in the oscillator output below a threshold level, said oscillator producing a transmitted output to the antenna to establish a radiation pattern therefrom for the detection of the motion of an object within said radiation pattern, and a detector diode coupled to the first loop to detect object-induced signals on the first loop to develop an output signal representative of the velocity of said object.

4. The invention described in claim 3 which further includes a variable capacitor connected between the junction formed between the first loop and the coil and ground, whereby the frequency of oscillation may be adjusted.

References Cited

UNITED STATES PATENTS

| | | | |
|---|---|---|---|
| 3,210,752 | 10/1965 | Bojko | 343—5 |
| 3,234,539 | 2/1966 | Bagno | 343—5 |

RODNEY D. BENNETT, JR., *Primary Examiner.*

CHARLES L. WHITMAN, *Assistant Examiner.*

U.S. Cl. X.R.

331—108; 336—84; 340—258